United States Patent Office 3,563,824
Patented Feb. 16, 1971

3,563,824
METHOD OF JOINING GLASSPLATE MEMBERS WITH POLYPHENYLENE OXIDES
Erich Behr, Siebengebirgsallee, Germany, assignor to Dynamit Nobel Aktiengesellschaft, Troisdorf, Bezirk Cologne, Germany, a corporation of Germany
No Drawing. Filed Jan. 26, 1967, Ser. No. 611,812
Claims priority, application Germany, Feb. 1, 1966, D 49,255
Int. Cl. B32b 17/10; C03c 27/10
U.S. Cl. 156—99                                  4 Claims

ABSTRACT OF THE DISCLOSURE

This specification describes the use of polyphenylene oxides, particularly poly-(2,6-dimethylphenol oxide) as glass cement.

---

Glass cements are generally well known. In the past acrylate, methacrylate and epoxy polymers have been used to cement two glass articles to each other or to cement one glass article to another solid article. In addition to these synthetic polymeric adhesives, various naturally occurring organic substances, such as picein, shellac, sealing wax and adhesive wax, have been used for glass cement. Some of the inorganic glass cements which have been used include water glass, kaolin and borax cement among others.

The following are the requirements of an optimum glass bonding agent:

(1) High elastic bonding power even at high temperatures.
(2) Good transparency when set.
(3) Equal effectiveness when used for bonding all types of glass.
(4) Must be usable without special pretreatment of the glass surface.
(5) Must be simple to use.

The cements known hitherto meet these requirements only in part.

It is therefor an object of this invention to provide a novel glass cement.

It is another object of this invention to provide a composite cemented glass article.

Other and additional objects of this invention will become apparent from a consideration of this entire specification including the appended claims.

In accord with and fulfilling these objects, one aspect of this invention includes the use of polyphenylene oxides as glass cement. More specifically, this invention envisions the use of 2,6-dimethylphenol oxide polymers as glass mement.

Polyphenylene oxides are themselves well known polymeric materials. For use in this invention, these polymers are made in the conventional fashion as polymers having molecular weights of about 10,000 to 100,000, preferably about 30,000. These polymers are then dissolved in a suitable solvent which is substantially inert to both glass and to the polymer. The solution is applied to the surface to be cemented and the other surface to be joined is positioned against the solution. The solvent is then removed, conveniently by evaporation and the two surfaces are thus firmly bonded together. It is preferred that the surfaces being bonded are forced together under pressure to insure a strong adhesion.

No prior treatment of the glass surface is required to produce a juncture which is clear and has a high bond strength even at 200° C. It is preferred to apply the polyphenylene oxide in a thin bubble-free layer.

Suitable solvents include: chlorinated hydrocarbons such as methylene chloride, chloroform, carbon tetrachloride, trichloroethylene or aromatic hydrocarbons such as benzene, toluene and xylene. The concentration of the solutions is only limited by the solubility of poly-2,6-dimethylphenol in the solvent. It is preferred that the solutions used generally contain 5 to 10% poly-2,6-dimethylphenol by weight. If the solution should assume a gel-like consistency, this is eliminated by slight heating.

Chloroform and trichlorethylene are particularly suitable solvents because their great dissolving power makes degreasing of the glass surface unnecessary. These solvents evaporate even at room temperature, which means that cementing can be done even at relatively low temperature. Aromatic hydrocarbons are retained more strongly by the polymer. Such solutions are advantageous if joints having a high elasticity are required. The cemented glass surfaces are dried in a known manner by the application of slight pressure. Heating considerably shortens the drying time. The cement must be applied without bubbles and in thin coats. If it is desired to apply thicker coats of cement, the parts to be cemented are first coated with a thin coat of cement, this coat is dried, and then another thin coat of cement is applied and the cementing is completed in the manner described above.

Anti-aging substances and ultraviolet absorbers can also be added to the cement.

EXAMPLE

Two glass plates 150 mm. long and 20 mm. wide are brushed with a solution of 75 g. of poly-2,6-dimethylphenol in 1000 g. of chloroform, overlapped on a length of 40 mm., and dried under light pressure applied by a screw clamp. In the traction test it was found that the cement failed at a load of about 50 kg., corresponding to a shear strength of about 6 kg./cm.$^2$. The straight shear strength is probably somewhat higher, because in this test a slight canting cannot be avoided and therefore it is a mixture of shearing strength and peel-resistance that is determined.

What is claimed is:

1. Method of joining two glass plate members which comprises dissolving a polyphenylene oxide in a substantially inert solution; applying said solution to a first glass surface; positioning the other glass surface to be bonded to said glass surface thereagainst; and then removing said solvent.

2. Method as cleimed in claim 1 wherein said polyphenylene oxide is a 2,6-dimethylphenol.

3. Method as claimed ih claim 2 wherein said solution contains about 5 to 10 weight percent polymer.

4. Method as claimed in claim 1 wherein said solvent is at least one selected from the group consisting of methylene chloride, chloroform, carbon tetrachloride, trichloroethylene, benzene, xylene and toluene.

References Cited

UNITED STATES PATENTS

| | | | |
|---|---|---|---|
| 1,831,462 | 11/1931 | Moss | 161—204 |
| 3,157,563 | 11/1964 | Baum | 161—204 |
| 3,306,875 | 2/1967 | Hay | 260—47 |
| 3,422,062 | 1/1969 | Segal et al. | 161—192X |

OTHER REFERENCES

"PPO: Secret No More," Chemical Week, Dec. 12, 1964, pp. 81–82.

JOHN T. GOOLKASIAN, Primary Examiner
R. A. KILLWORTH, Assistant Examiner

U.S. Cl. X.R.
156—327; 161—192